(12) United States Patent
Liu et al.

(10) Patent No.: US 9,528,487 B2
(45) Date of Patent: Dec. 27, 2016

(54) STARTER MOTOR CONTROL WITH PRE-SPIN

(75) Inventors: Xiangying Liu, Ann Arbor, MI (US); Chuck De Biasi, Plymouth Township, MI (US); Ravi Atluru, Westland, MI (US); Frederick Shell, Detroit, MI (US); Alan Francis Judge, Farmington Hills, MI (US); Sheran Anthony Alles, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 750 days.

(21) Appl. No.: 13/298,430

(22) Filed: Nov. 17, 2011

(65) Prior Publication Data

US 2013/0125850 A1    May 23, 2013

(51) Int. Cl.
 *F02D 17/00*    (2006.01)
 *F02N 11/08*    (2006.01)

(52) U.S. Cl.
 CPC ........ *F02N 11/0814* (2013.01); *F02N 11/0844* (2013.01); *F02N 11/0851* (2013.01); *F02N 11/0855* (2013.01); *F02N 2011/0874* (2013.01); *F02N 2250/02* (2013.01); *F02N 2300/106* (2013.01); *Y02T 10/48* (2013.01)

(58) Field of Classification Search
 CPC ..... F02N 11/087; F02N 11/08; F02N 11/0855; F02N 2300/102
 USPC ........... 123/179.3, 198 D, 179.25; 290/38 R; 307/10.1, 31
 See application file for complete search history.

(56) References Cited

U.S. PATENT DOCUMENTS

| | | | |
|---|---|---|---|
| 2,663,840 A | | 12/1953 | Haas |
| 3,777,366 A | * | 12/1973 | Kiefer .......................... 29/592.1 |
| 3,927,359 A | * | 12/1975 | Chen .............................. 318/434 |
| 4,417,198 A | * | 11/1983 | Mayfield ...................... 323/315 |
| 4,418,289 A | | 11/1983 | Mortensen |
| 4,806,223 A | * | 2/1989 | Murakami ........... C25D 17/004 204/206 |
| 4,947,051 A | | 8/1990 | Yamamoto et al. |
| 5,871,858 A | * | 2/1999 | Thomsen et al. ................. 429/7 |
| 6,104,157 A | | 8/2000 | Kramer et al. |
| 6,176,212 B1 | | 1/2001 | Vilou |
| 6,308,674 B1 | | 10/2001 | Ruehle et al. |
| 6,938,599 B2 | | 9/2005 | Senda et al. |
| 7,077,092 B2 | | 7/2006 | Senda et al. |
| 7,145,259 B2 | | 12/2006 | Spellman et al. |
| 7,218,010 B2 | * | 5/2007 | Albertson et al. .......... 290/38 R |

(Continued)

*Primary Examiner* — Hai Huynh
*Assistant Examiner* — Gonzalo Laguarda
(74) *Attorney, Agent, or Firm* — Frank A. MacKenzie; Price Heneveld LLP

(57) ABSTRACT

A control circuit receives a starting signal from a powertrain control module of a vehicle and delays the coupling of the main starting current from the battery to the starting motor until a reduced current in an alternative flow path is provided to the starter motor, initiating its motion. In a preferred, the pre-start sequence is controlled by a microprocessor which provides a control signal to a solid state switch coupled by a conductor providing current limiting resistance between the battery supply and the starter motor for a predetermined period of time. Subsequent to the pre-spin period, the control circuit provides a signal to a different solid state switch which activates the starter solenoid, in turn, coupling the battery to the starter motor and engaging the pinion gear with the ring gear.

20 Claims, 4 Drawing Sheets

(56) References Cited

U.S. PATENT DOCUMENTS

| | | | |
|---|---|---|---|
| 8,272,360 B2* | 9/2012 | Hartmann et al. | 123/179.3 |
| 8,362,862 B2* | 1/2013 | Bradfield | 335/268 |
| 8,872,369 B2* | 10/2014 | Bradfield | F02N 11/0851 |
| | | | 290/38 R |
| 2002/0014216 A1 | 2/2002 | Boegner et al. | |
| 2009/0316328 A1* | 12/2009 | Kernwein et al. | 361/264 |
| 2011/0118962 A1* | 5/2011 | Couetoux et al. | 701/113 |
| 2013/0127415 A1* | 5/2013 | Ohtomo | 320/109 |

* cited by examiner ly to FIG. 1, there is shown the system of
STARTER MOTOR CONTROL WITH PRE-SPIN

FIELD OF THE INVENTION

The present invention relates to a control circuit for a vehicle starting motor.

BACKGROUND OF THE INVENTION

When cold cranking a vehicle engine, the inrush current as the vehicle battery is coupled to the starting motor can be very significant, in the neighborhood of 900-1000 amps. Such starting current can, under some conditions, drop the battery voltage sufficiently to reset electrical systems in the vehicle. This problem is particularly acute in Stop/Start vehicles, where the battery goes through significant cycling and is near the end of life, also in winter months where the starting current available from a cold battery is further reduced. Some efforts have been made to minimize these undesirable starting problems by, for example, pulse width modulating the current applied to the starting motor. Such an approach, however, potentially creates electromagnetic interference issues, which can interfere with electrical control circuits within the vehicle. Also, with some diode-driven techniques, accidentally coupling the battery in reverse polarity can short the circuitry, causing damage to the starting circuit. Accordingly, there exists a need for an improved starting system in which the current applied to a starting motor is controlled in an effective, reliable, and inexpensive manner, which does not overload a battery and allows appropriate synchronization of a starter pinion gear with the drive train ring gear to prevent milling and minimize noise, vibration, and harshness during the starting sequence.

SUMMARY OF THE INVENTION

The system of the present invention accomplishes this goal by providing a control circuit receiving starting signals from a power control module of the vehicle and delaying the coupling of the main starting current from the battery to the starting motor until a reduced current in an alternate flow path is provided to the starter motor, initiating its motion. In a preferred embodiment of the invention, the desired pre-start sequence is controlled by a microprocessor which provides a control signal to a solid state switch coupled by a conductor providing current limiting resistance between the battery supply and the starter motor for a predetermined period of time. Subsequent to this pre-spin period, the control circuit provides a signal to a different solid state switch which activates the starter solenoid, in turn, coupling the battery to the starter motor and engaging the pinion gear with the ring gear. This sequence of operation provided by the control circuit assures the vehicle engine is started with the minimum of battery current drain and wear on the starting pinion gear and is accomplished in a relatively inexpensive control circuit which does not adversely affect other electrical circuits within the vehicle.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
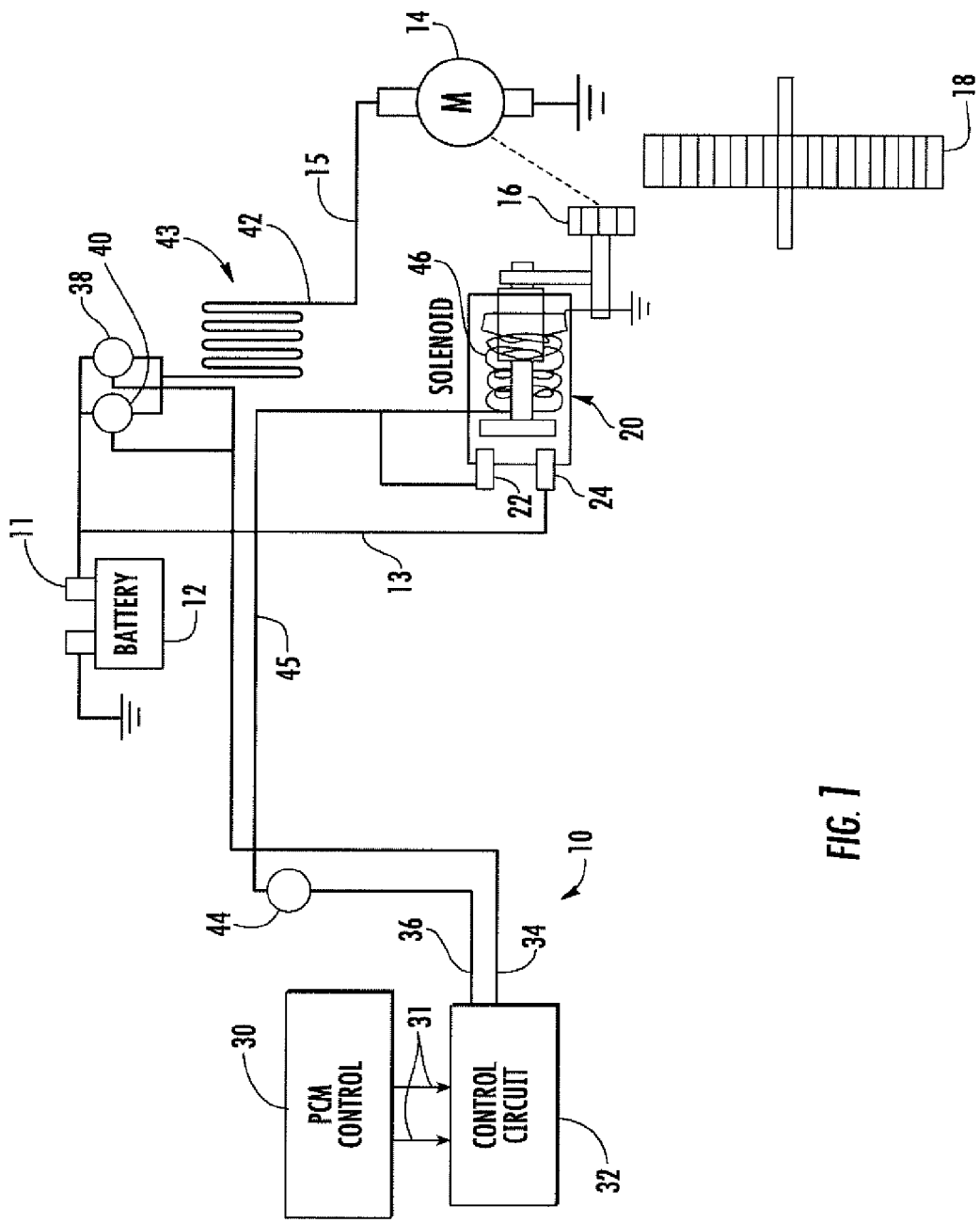
FIG. 1 is an electromechanical diagram in block and schematic form of the control system of the present invention.
Figure 2:
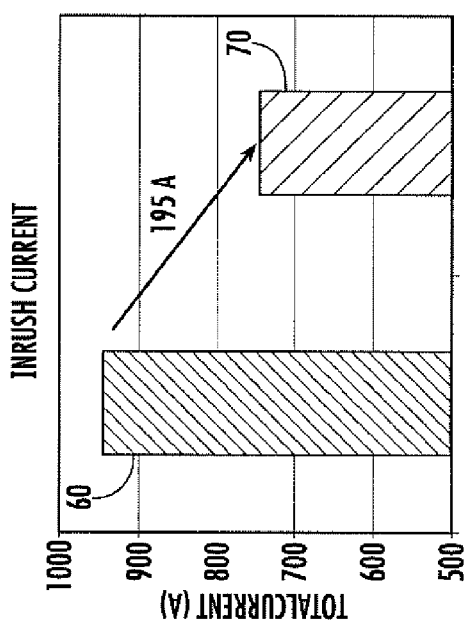
FIG. 2 is a bar graph comparing conventional starting currents as compared to the starting current with the system of the present invention.

Referring initially to FIG. 1, there is shown the system of the present invention in an electromechanical schematic/block diagram form. The control system 10 is employed for controlling the current from the vehicle's battery 12 to the starting motor 14, which, in turn, is coupled to a pinion gear 16 which selectively engages the ring gear 18 of the vehicle's powertrain. In a typical starting circuit, the battery would be coupled to the coil 46 of the starting solenoid 20 which engages contacts 22, 24 to supply current from battery 12 through conductors 13 and 15 directly to the starting motor 14. When activated, the solenoid 20 also moves the pinion gear 16 into meshing engagement with ring gear 18. This normal sequence requires a significant amount of inrush current. As illustrated by the bar graph 60 shown in FIG. 2, the current can range in the neighborhood of from about 900 to nearly 1000 amps, which drops the battery voltage from a normal 12 volts to frequently below 7 volts, as shown by the bar graph 62 in FIG. 3. The time in which it takes the starter motor to crank the ring gear over 300° is shown by graph 64 in FIG. 4, indicating the time is approximately 285 ms. This relatively high inrush of current not only taxes the life of battery 12, particularly during cold weather conditions, but also can cause sudden motion of the pinion gear 16 engaging ring gear 18, which can cause milling of the gear and increase the noise, vibration, and harshness of the starting sequence which, in currently designed vehicles, is desired to be minimized.

Figure 6:
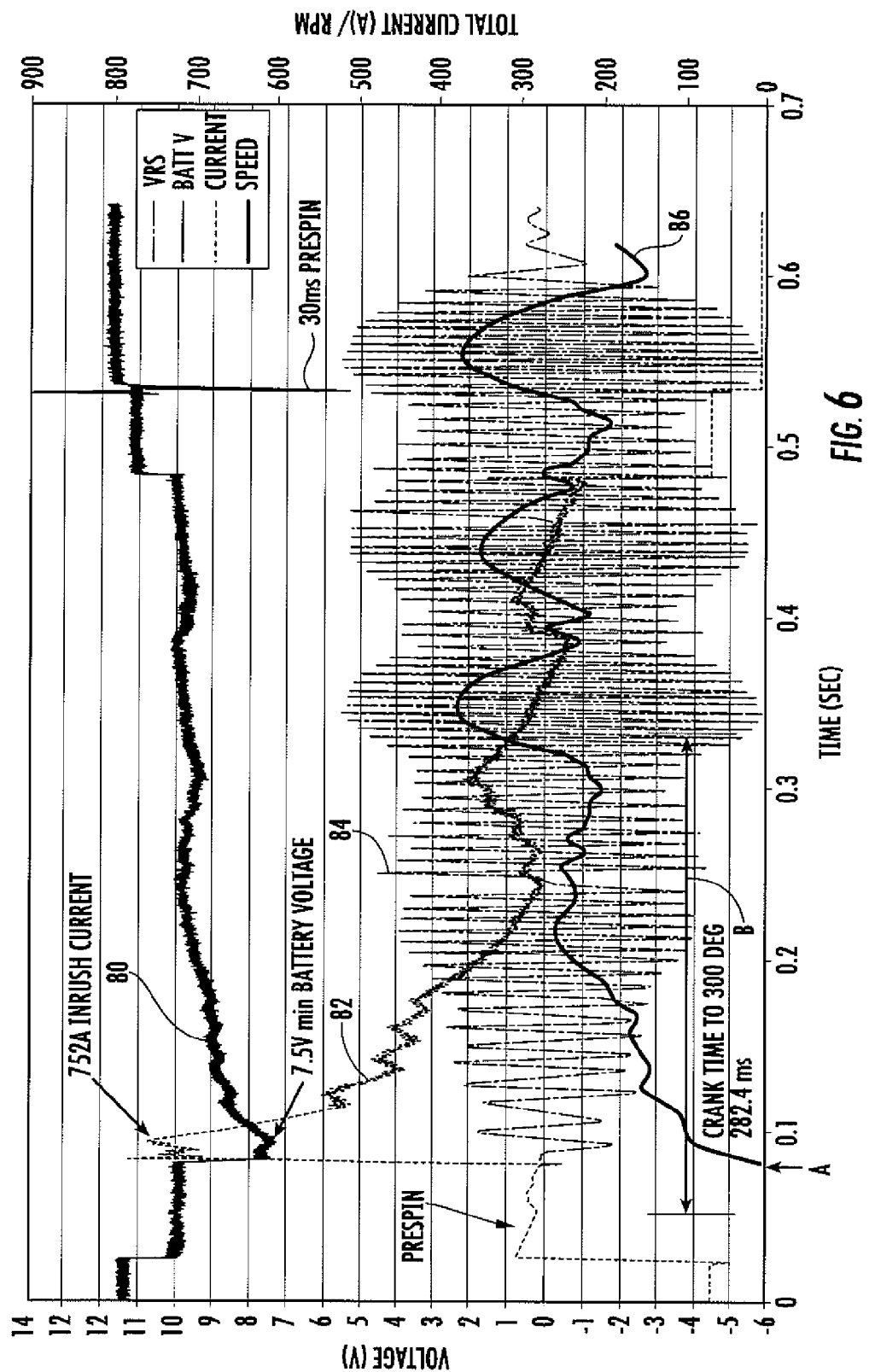
FIG. 6 is a voltage current time diagram illustrating the engine starting sequence, including the variable reluctance sensor voltage, the battery voltage and current, and the engine crank speed for the system of the present invention.

In order to improve the minimum battery voltage, minimize gear milling, and reduce the stress on battery 12, the control system 10 of the present invention is employed. The control system 10 receives signals from the vehicle's powertrain control module 30, which, when the vehicle operator depresses a start switch or turns an ignition key to a start position, provides a starting signal to control circuit 32 thorough an electrical bus communication 31 coupling circuit 30 to circuit 32. Circuit 32 includes a microprocessor programmed through conventional memory to respond to signals 31 to provide control output signals at a first output conductor 34 for initiating a spin sequence of operation for the starter motor followed by a conventional starter motor control signal on conductor 36 after a predetermined delay, as illustrated in FIG. 6 and discussed below. Conductor 34 provides a control signal to turn on a pair of parallel, coupled MOSFETs 38, 40 which have one terminal coupled to the battery's positive terminal 11 and a second terminal coupled by a conductor 42 to the motor terminal directly. The parallel coupled MOSFETs can be conventional, although in one embodiment they were manufactured by International Rectifier, Model IRFB3006.

Conductor 42 coupling the MOSFETs to the starter motor 14 is a relatively small gauge wire, such as 14 gauge, and is wrapped upon itself in serpentine fashion, as shown in FIG. 1 at 43, to provide an non-inductive load to the MOSFETs 38, 40 with respect to starter motor 14. The wire length is selected to provide a relatively low resistance of from about 15 to about 30 milliohms (mΩ), which limits the current applied to the starting motor, as illustrated by the bar graph 70 in FIG. 2. In one embodiment, a 14 gauge wire 42 was three meters in length and had a resistance of about 30 mΩ. When MOSFETs 38, 40 were activated during the pre-spin mode for about 50 ms, the temperature rose a small value of 0.8° C. The conductor 42 is important in that its inductance must be minimized while still providing the reduced amount of current to the starting motor to begin rotating the pinion gear at a relatively low speed and torque. The conductor 42 is wound by overlapping alternate layers of the conductor to cancel the inductive effect of the current flowing through the conductor from MOSFETs 38, 40 to motor 14. Conductor 42 thus must be sufficiently lengthy to provide from about 15 to about 30 mΩ resistance without presenting a high inductive load to the path to motor 14 and MOSFETs 38, 40. By folding the wire back upon itself, as necessary, the inductive electromagnetic field is cancelled and the conductor 42 has a negligible inductance to the initial current pulse. There is no resistor used in the circuit. A resistor with such low value and power rating would be expensive and, therefore, cost prohibitive. Circuit 32 is programmed to provide a delay of from about 30 to about 100 ms before an output signal is applied to conductor 36 to activate MOSFET 44, which is coupled by conductor 45 to solenoid coil 46 for activating the solenoid 20, closing contacts 22 and 24, and applying the main current from battery 11 by conductors 13 and 15. When this occurs, the pinion gear 16 has initiated rotation through about 300 ms crank time. With this system, it is possible to eliminate the mesh spring in the starter solenoid.

Figure 3:
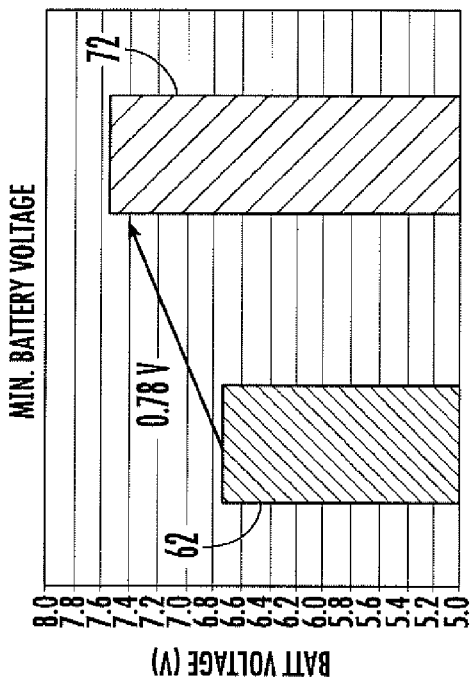
FIG. 3 is a bar graph comparing the battery voltage drop in a conventional starting system as compared to the system of the present invention.
Figure 4:
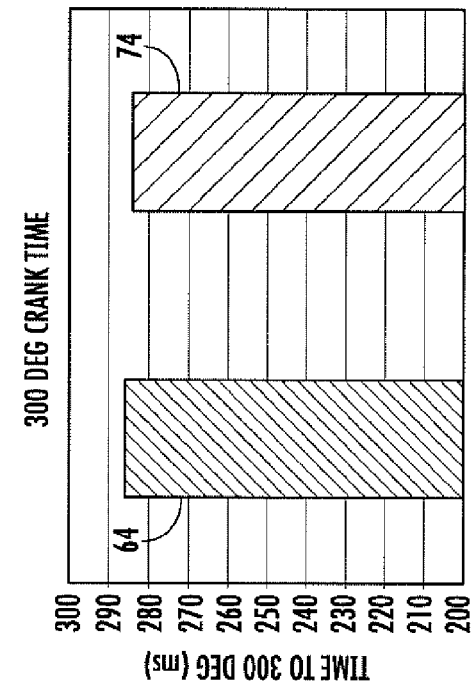
FIG. 4 is a bar graph illustrating the 300° crank time for conventional starting systems as compared to the system of the present invention.

The voltage on battery 12, during the initial pre-spin mode of operation, is reduced significantly less, as illustrated in FIG. 3 by bar graph 72, as compared to the conventional starting sequence as represented by bar graph 62. With a conventional starting sequence, the voltage of a 12-volt battery may drop to about 6.7 volts. With the pre-start sequence, provided by circuit 32, however, with the reduced initial current, the battery voltage only drops to approximately 7.5 volts, a significant improvement over the direct connection of the battery to the starting motor. As can be seen by reference to FIG. 4, the crank time for 300° rotation of the engine (an amount sufficient to rotate the engine to at least the first piston) is also slightly reduced as shown by bar graph 74, indicating that the crank time is slightly over 284 ms as opposed to 286 ms for a conventional starting sequence. Thus, the improved reduced current pre-spin mode of operation does not affect and, in fact, slightly improves the crank time of the engine.

Figure 5:
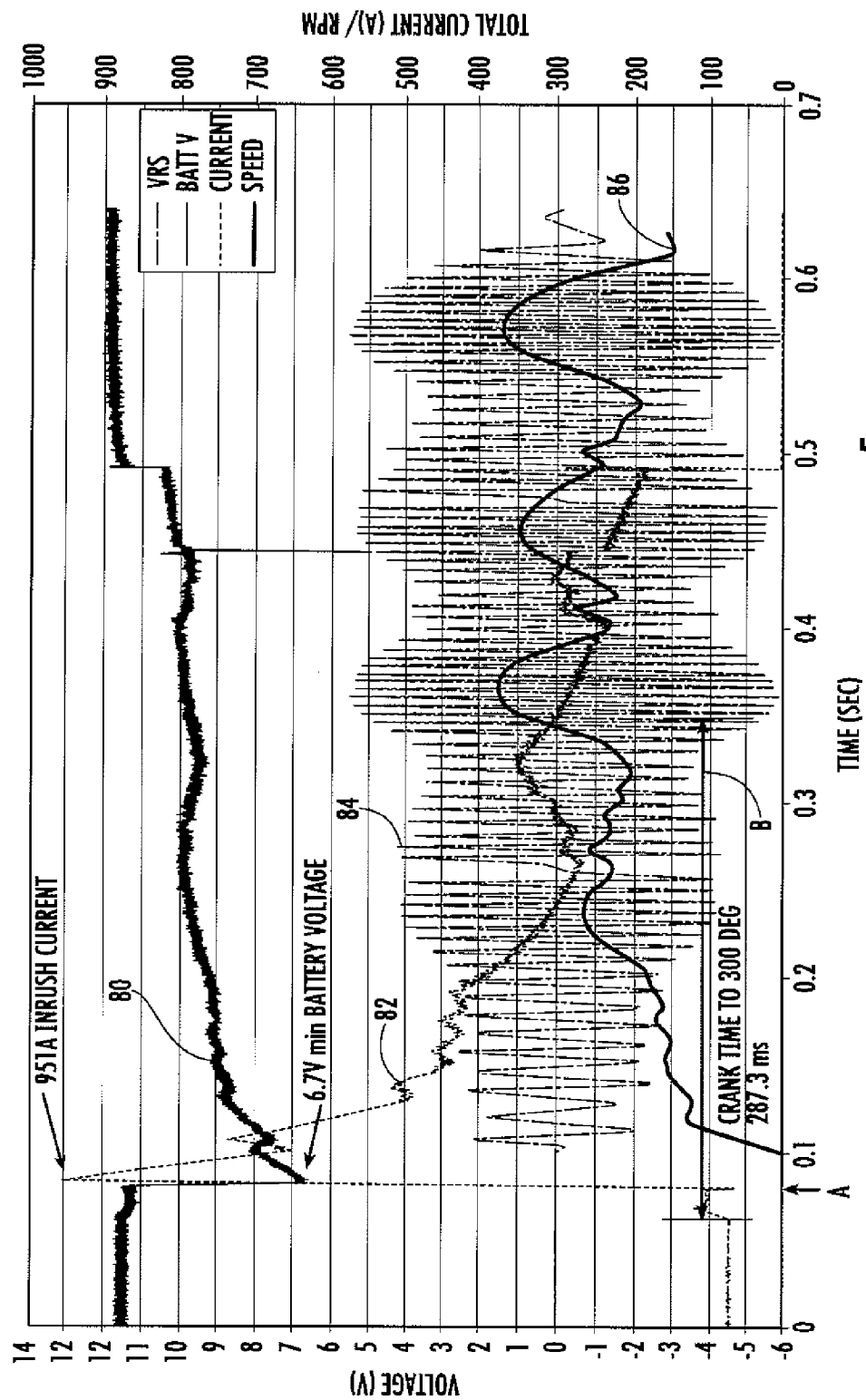
FIG. 5 is a voltage current time diagram illustrating the engine starting sequence, including the variable reluctance sensor voltage, the battery voltage and current, and the engine crank speed for a conventional starting system.

The dramatic change in the starting current and battery voltage with respect to the pre-spin mode provided by circuit 32 is best seen by comparing the charts of FIGS. 5 and 6. FIG. 5 shows a conventional starting sequence with solenoid 40 being activated directly upon the start signal being received by PCM control 30 without the benefit of the control circuit 32. The battery voltage is represented by graph 80 in both diagrams. As can be seen, when the start is initiated at point A in both figures, the battery voltage drops below 7 volts in the conventional starting sequence, whereas, with the pre-spin sequence, it remains at about 7.5 volts minimum. The current waveform is shown by waveform 82 in both figures and again the inrush pulse of current in the conventional starting sequence of FIG. 5 is approximately 951 amps in one test and reduced to about 750 amps in the pre-spin system of the present invention. The actual engine speed is measured by variable reluctance sensor and is shown by the waveform 84 in both diagrams.

As shown by arrow B in FIGS. 5 and 6, the time from initiation of the start command from the PCM control 30 until the time the engine has begun running is slightly less than 300 ms. Waveform 86 represents a signal from a zero crossover detector of the variable reluctance sensor of waveform diagram 84 and is a measure of the engine speed during the cranking process. Thus, it is seen from FIGS. 2-6 that the current drain on battery 12 utilizing the pre-spin control circuit 32 of the present invention is significantly reduced without affecting the performance of the starting motor and engine ignition. With the relatively inexpensive microprocessor program control circuit 32 programmed to provide delayed output signals at output conductors 34, 36 to associated MOSFETs 38, 40, and 44, respectively, for initially providing a reduced current to starter motor 14 followed by the normal cranking current through solenoid contacts 22, 24 on conductor 13 from battery 12. Ideally, the delay is from 30 to 100 ms, with the rotational speed of pinion gear 16 being about 100-200 rpm. In one preferred embodiment, the delay in the application of the normal starting current was approximately 50 ms. It should be understood by those skilled in the art that, with different vehicles with different starters and engines, these numbers may vary about 10%.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A circuit for initiating a starting sequence for an internal combustion engine comprising:
   a source of electrical power;
   a starter motor;
   a gear system selectively coupling said starter motor to an engine to be started;
   a control circuit for providing electrical energy only to said starter motor initially for a predetermined time completely bypassing a starting solenoid and subsequently providing electrical energy to the starting solenoid such that said gear system starts rotating the engine from a non-rotating state, wherein the source of electrical power continually outputs 7.5 or more volts during the starting sequence;
   a first conductor directly connecting the control circuit to the starter motor, the first conductor providing a control signal to turn on a pair of parallel, coupled switches having a first terminal coupled to the source of electrical power and a second terminal coupled to the starter motor directly, wherein the first conductor is wrapped such that a first current level is supplied to the motor; and
   a second conductor coupled to the starting solenoid, wherein the solenoid receives a second current level that is greater than the first current level.

2. The circuit as defined in claim 1 and further including a vehicle powertrain control module and wherein said control circuit is coupled to receive an electrical starter signal from said vehicle powertrain control module and generate first and second output control signals in response thereto.

3. The circuit as defined in claim 2 wherein said control circuit includes a first output electrically coupled with at least one solid state switch that is further coupled to said first output and first and second switch terminals coupled between said source of electrical power and said starter motor.

4. The circuit as defined in claim 3 wherein said control circuit further includes a conductor of predetermined resistance of about 30 milliohms or less coupled between said starter motor and said solid state switch.

5. The circuit as defined in claim 4 wherein said solid state switch includes a pair of parallel coupled MOSFETs.

6. The circuit as defined in claim 5 wherein said conductor has a resistance of about 15 to about 30 milliohms.

7. The circuit as defined in claim 6 wherein said conductor is wrapped upon itself to minimize its inductance.

8. The circuit as defined in claim 7, wherein the solenoid does not include a mesh spring.

9. The circuit as defined in claim 8 wherein said first output control signal is a pulse having a duration of from 30 milliseconds to 100 milliseconds.

10. The circuit as defined in claim 9 wherein said control circuit provides a second output control signal at said second output, wherein said second output signal is applied to a control terminal of a second solid state switch coupled between said source of operating power and a starting solenoid associated with said starter motor.

11. The circuit as defined in claim 10 wherein said source of operating power is a battery.

12. A circuit for initiating a starting sequence for an internal combustion engine comprising:
   a battery;
   a starter motor;
   a starter solenoid;
   a gear system including a pinion gear coupled to said starter solenoid and a ring gear coupled to an engine to be started;
   a control circuit for providing electrical energy only from said battery to said starter motor for a predetermined time and subsequently from said battery to said starter solenoid such that said pinion gear rotates said ring gear for starting the engine from a stopped state; and
   a conductor directly connecting the control circuit and the battery through a common switch to the starter motor, wherein there are no resistors disposed along the conductor and the conductor is wrapped in a serpentine pattern to supply less current to the motor than the solenoid.

13. The circuit as defined in claim 12 wherein said control circuit includes a first output electrically coupled with at least one solid state switch that is further coupled to said first output and first and second switch terminals coupled between said battery and said starter motor.

14. The circuit as defined in claim 13 wherein said control circuit further includes a conductor of predetermined resistance coupled between said starter motor and said solid state switch.

15. The circuit as defined in claim 14 wherein said conductor has a resistance of about 15 to about 30 milliohms.

16. The circuit as defined in claim 15 wherein said conductor is wrapped upon itself to minimize its inductance.

17. The circuit as defined in claim 12 wherein the conductor has a pre-defined length by a pre-defined resistance.

18. A circuit for initiating a starting sequence for an engine comprising:
   a battery;
   a starter motor;
   a starter solenoid;
   a gear system including a pinion gear coupled to said solenoid and a ring gear coupled to a stopped engine; and
   a control circuit including a conductor for providing electrical energy from said battery to only said starter motor for a predetermined time and subsequently from said battery to said solenoid to initiate the engine.

19. The circuit as defined in claim 18 wherein said conductor is wrapped upon itself to minimize its inductance.

20. The circuit as defined in claim 18 wherein the conductor supplies less current to the motor than the solenoid through a variance in conductor length.

* * * * *